R. B. HUNTER.
ELECTRICAL CONTROLLER.
APPLICATION FILED JULY 19, 1920.

1,420,842.

Patented June 27, 1922.
2 SHEETS—SHEET 1.

Inventor
Richard B. Hunter.
By Frank H. Hubbard
Attorney

R. B. HUNTER.
ELECTRICAL CONTROLLER.
APPLICATION FILED JULY 19, 1920.

1,420,842.

Patented June 27, 1922.
2 SHEETS—SHEET 2.

Inventor
Richard B. Hunter
By [signature]
Attorney

UNITED STATES PATENT OFFICE.

RICHARD B. HUNTER, OF MILWAUKEE, WISCONSIN, ASSIGNOR TO THE CUTLER-HAMMER MFG. CO., OF MILWAUKEE, WISCONSIN, A CORPORATION OF WISCONSIN.

ELECTRICAL CONTROLLER.

1,420,842.  Specification of Letters Patent.  Patented June 27, 1922.

Application filed July 19, 1920. Serial No. 397,373.

*To all whom it may concern:*

Be it known that I, RICHARD B. HUNTER, a citizen of the United States, residing at Milwaukee, in the county of Milwaukee and State of Wisconsin, have invented new and useful Improvements in Electrical Controllers, of which the following is a full, clear, concise, and exact description, reference being had to the accompanying drawing, forming a part of this specification.

This invention relates to electrical controllers and more particularly to controllers adapted to effect joint control including series-parallel commutation of a plurality of electric motors.

In numerous installations, it is necessary or desirable to provide for joint energization of a plurality of motors from either of a plurality of sources of electrical energy which differ from one another widely in voltage or other electrical condition.

Thus in the operation of mine locomotives, which are ordinarily provided with two or more motors adapted to series-parallel commutation, it is highly important to provide for driving the motors under certain conditions from a storage battery of relatively low voltage capacity, and under other conditions to drive the motors directly from a relatively high voltage generator through suitable trolleys or other line connections, and the present invention has among its objects that of providing a controller for motors to be operated under the foregoing and analogous conditions.

Another object is that of providing a simplified controller of the character aforestated utilizing, in the main, standard parts.

Another object is that of providing a controller of the character stated adapted automatically and positively to vary the character of control effected thereby for maintaining substantially a uniform character of joint operation of the motors whether supplied from one or the other of the aforementioned sources.

Other objects and advantages will hereinafter appear.

In patent numbered 1,341,937, granted June 1st, 1920, to Wilmer M. Shallcross is disclosed an improved type of drum controller and the instant invention contemplates the adaptation of such controller to the foregoing purposes without necessitating alterations in structure or manner of operation thereof.

Figure 1:
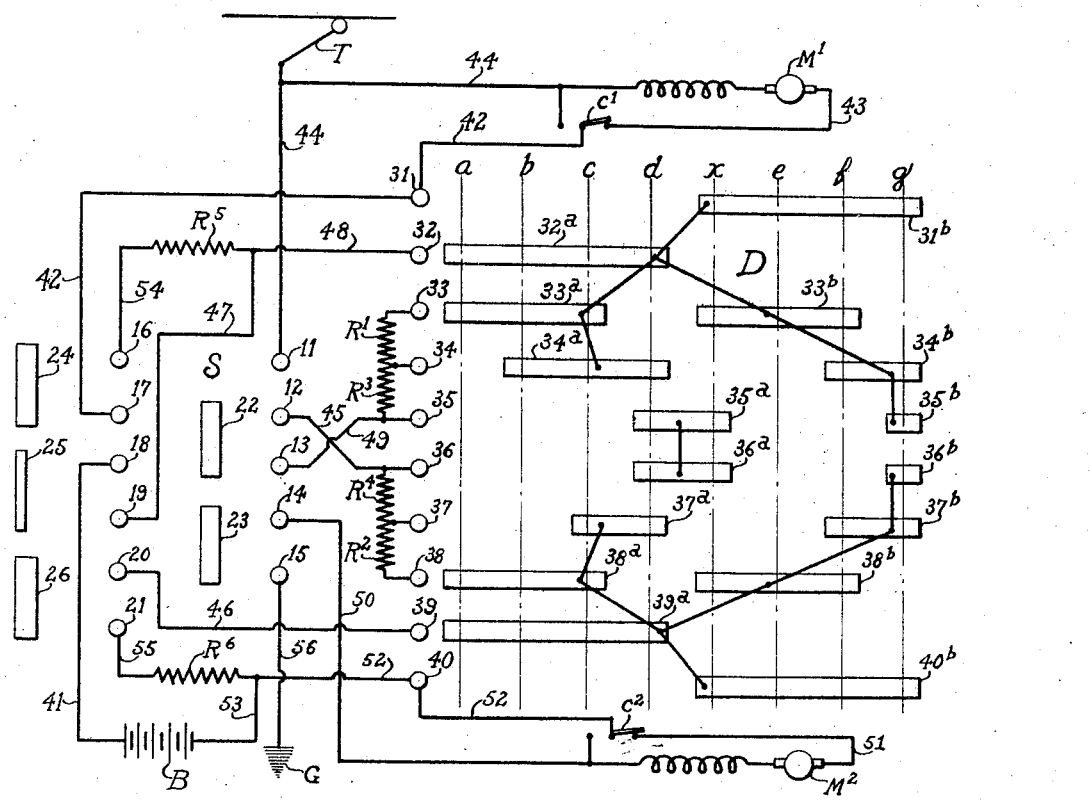
Figure 2:
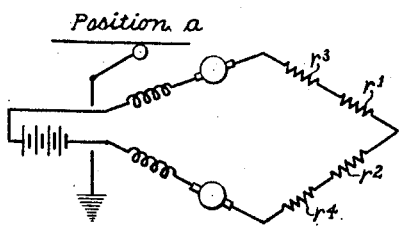
Figure 3:
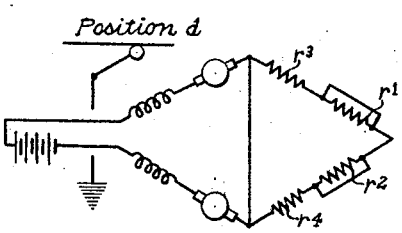
Figure 4:
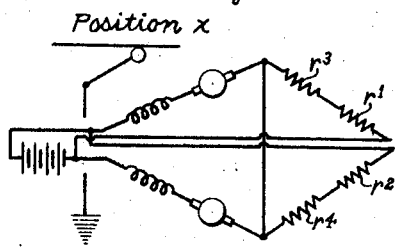
Figure 5:
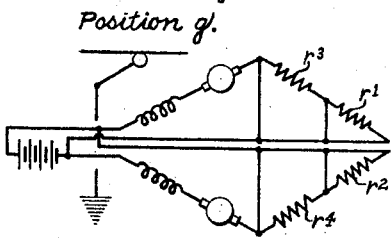
Figure 6:
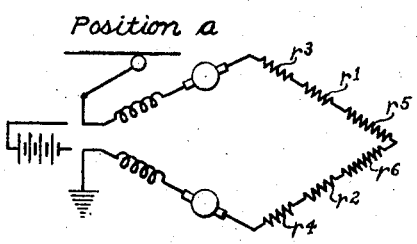
Figure 7:
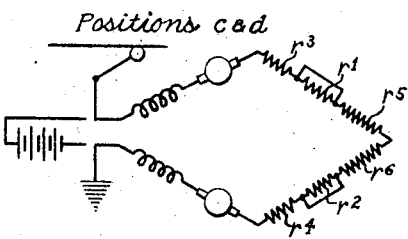
Figure 8:
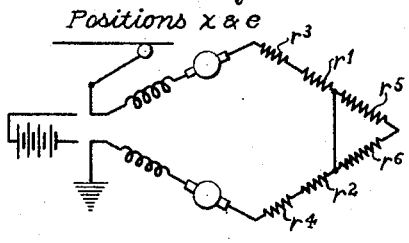
Figure 9:
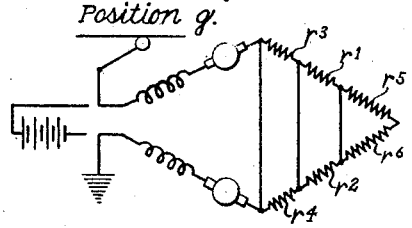

In the accompanying drawing wherein is illustrated an embodiment of the invention, Fig. 1 is a diagrammatic view of the same; while, Figs. 2 to 9 are simplified diagrams illustrating different phases of operation of the controller.

Referring to Fig. 1 of the drawing, the same illustrates a controller adapted to effect joint acceleration and deceleration control including series parallel commutation of a pair of electric motors $M^1$, $M^2$, said motors to be jointly supplied with current, optionally from a relatively low voltage battery B or from a relatively high voltage generator through a trolley indicated at T. A transfer switch S serves to effect selection between said supply sources while a drum controller D provides for direct and joint control of the motors.

In practice, said switch and said drum controller are preferably provided with a single handle for operating the same selectively, said handle being removable from the drum controller only when the latter is in the off position illustrated, thus, insuring de-energization of the motors prior to operation of the transfer switch.

Steps of starting resistance $R^1$ to $R^6$ are provided for the motors, the steps $R^5$ and $R^6$, however, to be in circuit only when the motors are deriving current from the trolley T, whereas the drum controller is adapted to commutate the circuits of the motors from series to parallel during acceleration but only when the motors are deriving current from the battery B. Cutout switches $C^1$ and $C^2$ are provided for by-passing either of the motors should the same become disabled or should service thereof be not required.

The transfer switch S may advantageously comprise two rows of stationary contacts spaced circumferentially through an angle of 180° and comprising respectively contacts 11 to 15 and 16 to 21 while a movable contactor comprising two rows of bridging segments similarly displaced through an angle of 180° is adapted to cooperate with said stationary contacts for connecting the drum controller either across the battery or between the trolley and the ground indicated at G.

In practice one row of said movable bridging contacts comprises contacts 22 and 23 whereas the other row comprises contacts 24, 25 and 26 of which the contact 25 is of reduced circumferential extent whereby with the switch in its extreme right-hand position said contact does not engage its adjacent stationary contacts. In other respects, said bridging contacts are similar to one another and the rows thereof are similarly and symmetrically arranged.

The drum controller D, which is preferably of the type disclosed and claimed in the aforementioned patent, comprises a row of ten stationary contacts 31 to 40 and a rotatable drum carrying 16 segments adapted respectively to co-operate with individual stationary contacts and being designated by corresponding reference characters. Said drum is adapted to move from right to left and to assume operative positions $a$, $b$, $c$, $d$, $x$, $e$, $f$, $g$ in addition to the neutral position illustrated, the position $x$ being transitory in that commutation of the motors from series to parallel or vice versa is effected at this point.

The operation of the controller and the various connections effected thereby will now be described, reference being had to the simplified diagrams illustrated in Figs. 2 to 9 as well as to the main diagram.

Movement of the transfer switch to its extreme left hand position serves to bridge the following stationary contacts thereof, namely, contacts 11 and 12, 13 and 14, 17 and 18, 19 and 20, thus connecting the drum controller across the battery, and following movement of said controlled drum to position $a$, the motors are connected across the battery in series relation to one another through resistance $R^1$ to $R^4$.

The motor circuit as thus completed extends from the left hand terminal of the battery by conductor 41 across contacts 18 and 17 of the transfer switch by conductor 42 through cutout switch $C^1$ by conductor 43 through motor $M^1$ together with its series field, thence by conductor 44 across contacts 11 and 12 of the transfer switch, thence by conductor 45 through resistances $R^4$ and $R^2$ through contacts 38, 38$^a$, 39$^a$ and 39 of the drum controller by conductor 46 across contacts 20 and 19 of the transfer switch, thence by conductors 47 and 48 through contacts 32, 32$^a$, 33$^a$, 33 of the drum controller, thence through resistance $R^1$ and $R^3$, by conductor 49 across contacts 13 and 14 of the transfer switch by conductor 50 through the field and armature of motor $M^2$ by conductor 51 through cutout switch $C^2$ and by conductors 52 and 53 to the right-hand terminal of the battery.

Movement of the controller drum to position $b$ serves to short-circuit the resistance section $R^1$ through engagement of segment 34$^a$ of the drum controller with its co-operating contact 34, the circuit remaining otherwise unchanged. Moreover, progressive movement of the drum to its subsequent positions serves to effect further acceleration of the motors through exclusion of the series resistance steps and also serves upon transit through the position $x$ to effect commutation of the motors from series to parallel relation while maintaining continuity of circuit the resistance sections $R^1$ to $R^4$ being reincluded in circuit and thereafter short-circuited progressively in pairs comprising one section for the circuit of each motor, whereby the motors are accelerated in a well known manner. Stages of operation of the controller corresponding with positions $a$, $d$, $x$ and $g$ of the drum controller are illustrated in the simplified diagrams of Figs. 2 to 5, the circuit connections effected being obvious from said diagrams.

Movement of the transfer switch to the right serves to bridge the following contacts thereof, namely, 12 and 13, 14 and 15, 16 and 17, 20 and 21; contacts 18 and 19 on the other hand being unconnected owing to the reduced circumferential extent of the bridging contact 25 aforedescribed.

Such action of the transfer switch serves to connect the drum controller between trolley T and ground G and upon movement of the drum controller to position $a$, the motors are connected across said supply circuit in series with one another. Moreover, under these conditions the resistance steps $R^5$ and $R^6$ are included in series in addition to resistances $R^1$ to $R^4$ which were included in the instance formerly described.

The circuit of the motors as thus established extends from trolley T by conductor 44 through the field and armature of motor $M^1$ thence by conductor 43 through cutout switch $C^1$ by conductor 42 across contacts 17 and 16 of the transfer switch, thence by conductor 54 through resistance $R^5$, by conductor 48 through contacts 32, 32$^a$, 33$^a$, and 33 of the drum controller, thence through resistances $R^1$ and $R^3$, by conductor 49 across contacts 13 and 12 of the transfer switch, by conductor 45 through resistances $R^4$ and $R^2$, thence through contacts 38, 38$^a$, 39$^a$ and 39 of the drum controller, by conductor 46 across contacts 20 and 21 of the transfer switch, by conductor 55 through resistance $R^6$, thence by conductor 52 through cutout switch $C^2$, by conductor 51 through motor $M^2$ together with its field, by conductor 50 across contacts 14 and 15 of the transfer switch, thence by conductor 56 to ground.

Movement of the drum progressively through positions $b$ and $c$ serves to short-circuit resistance $R^1$ and $R^2$ progressively.

Movement of the drum to position $d$ effects no change in the foregoing circuit connections. However, movement of the drum from position $d$ to position $x$ serves to interrupt momentarily the aforedescribed connections and to immediately reestablish series connection of the motors exclusive of resistance $R^5$ and $R^6$, resistance $r^1$ and $r^2$ however being re-included in circuit. Said circuit extends from the trolley T through motor $M^1$ as last traced to contact 31 of the drum controller, thence through contacts $31^b$, $33^b$, and 33 thereof through resistances $R^1$ and $R^3$, thence through contacts 35, $35^a$, $36^a$ and 36 of the drum controller or alternatively across contacts 12 and 13 of the transfer switch, thence through resistances $R^4$ and $R^2$ and through contacts 38, $38^b$, $40^b$, and 40 of the drum controller, thence by conductor 52 through motor $M^2$ to ground as formerly traced. The circuit connections for position $e$ are unchanged.

Further movement of the drum progressively to positions $f$ and $g$ serves to exclude from the aforedescribed circuit first resistances $R^1$ and $R^2$ simultaneously and thereafter resistances $R^3$ and $R^4$ simultaneously, whereby the motors are finally connected in series directly across the supply line.

The controller thus provides for like operations of the drum to effect the same number of resistance varying steps for both on positions of the transfer switch and provides positively against establishment of starting connections between the trolley and the motors except through additional resistance steps $r^5$ and $r^6$, while also positively preventing parallelling of the motors while being supplied from the trolley, thereby compensating for difference in voltage of the supply sources. Moreover, by proper selection of the ohmic values of the various resistance steps with reference to the relative voltages of said sources the values of the corresponding steps of acceleration may be rendered substantially equal and the torque speeed characteristics of the motors rendered similar for like operating points of the drum controller irrespective of the selection effected by the transfer switch.

Obviously by increasing the number of segments and operating points of the drum the number of steps of resistance variation may be increased if desired.

What I claim is new and desire to secure by Letters Patent is:

1. The combination with a plurality of sources of electrical energy which differ from one another in electrical condition and a plurality of motors to be supplied jointly from either of said sources, of control means for said motors providing for acceleration including series parallel commutation of the circuits thereof and also providing for selection between said sources and for limiting the circuit commutating power thereof to the commutation of series connections upon selection of certain of said sources.

2. The combination with a plurality of sources of electrical energy which differ from one another in electrical condition and a plurality of motors to be supplied jointly from either of said sources, of control means for said motors providing for acceleration including series parallel commutation of the circuits thereof and also providing for selection between said sources, said control means having associated means rendering the same incapable of establishing parallel connection of the motors when supplied from certain of said sources.

3. The combination with two sources of current which differ from one another in voltage and a plurality of motors to be jointly supplied from either of said sources, said motors being adapted to series parallel commutation and being provided with starting resistance to be progressively excluded for acceleration, of an accelerating controller for said motors adapted to effect selection between said sources such selecting operation of said switch serving to effect selection of the value of such resistance to be included in circuit at starting, to thereby compensate for such difference in voltage of said sources.

4. The combination with two sources of current which differ from one another in voltage and a plurality of motors to be jointly supplied from either of said sources, of a controller for said motors for effecting acceleration including series parallel commutation of the circuits thereof, said controller being adapted to effect selection between said sources, such operation of the controller serving to vary the character of the control effected thereby in accordance with the character of the source selected to provide for joint resistance variation acceleration of the motors in a like number of steps while maintaining the torque speed characteristics of the individual motors substantially the same when supplied from either of said sources.

5. The combination with a plurality of sources of electrical energy which differ from one another in voltage, of a plurality of motors to be energized jointly from either of said sources and control means for said motors comprising a drum controller for effecting acceleration including series parallel commutation of the circuits thereof and a switch to effect selection between said sources and to vary the character of control effected by said drum controller to compensate for such difference in voltage of said sources.

6. The combination with a plurality of sources of electrical energy which differ from one another in electrical condition, of a plurality of motors to be energized jointly from either of said sources and control means for said motors comprising a drum controller for effecting acceleration including series parallel commutation of the circuits thereof and a switch to effect selection between said sources and to prevent connection of said motors in parallel relation by said drum controller upon selection of certain of said sources.

7. The combination with two sources of electrical energy which differ from one another in voltage, of a plurality of motors to be supplied jointly from either of said sources, said motors being provided with steps of starting resistance, of control means for the motors comprising a drum controller to effect joint resistance variation and series parallel commutation thereof and a switch to effect selection between said sources, said switch being adapted upon operation thereof to select the one of said sources having the higher voltage to increase the value of starting resistance to be included in circuit by the drum controller and to limit the action of the latter to the commutation of series connections for the motors.

In witness whereof, I have hereunto subscribed my name.

RICHARD B. HUNTER.